United States Patent Office 3,220,552
Patented Nov. 30, 1965

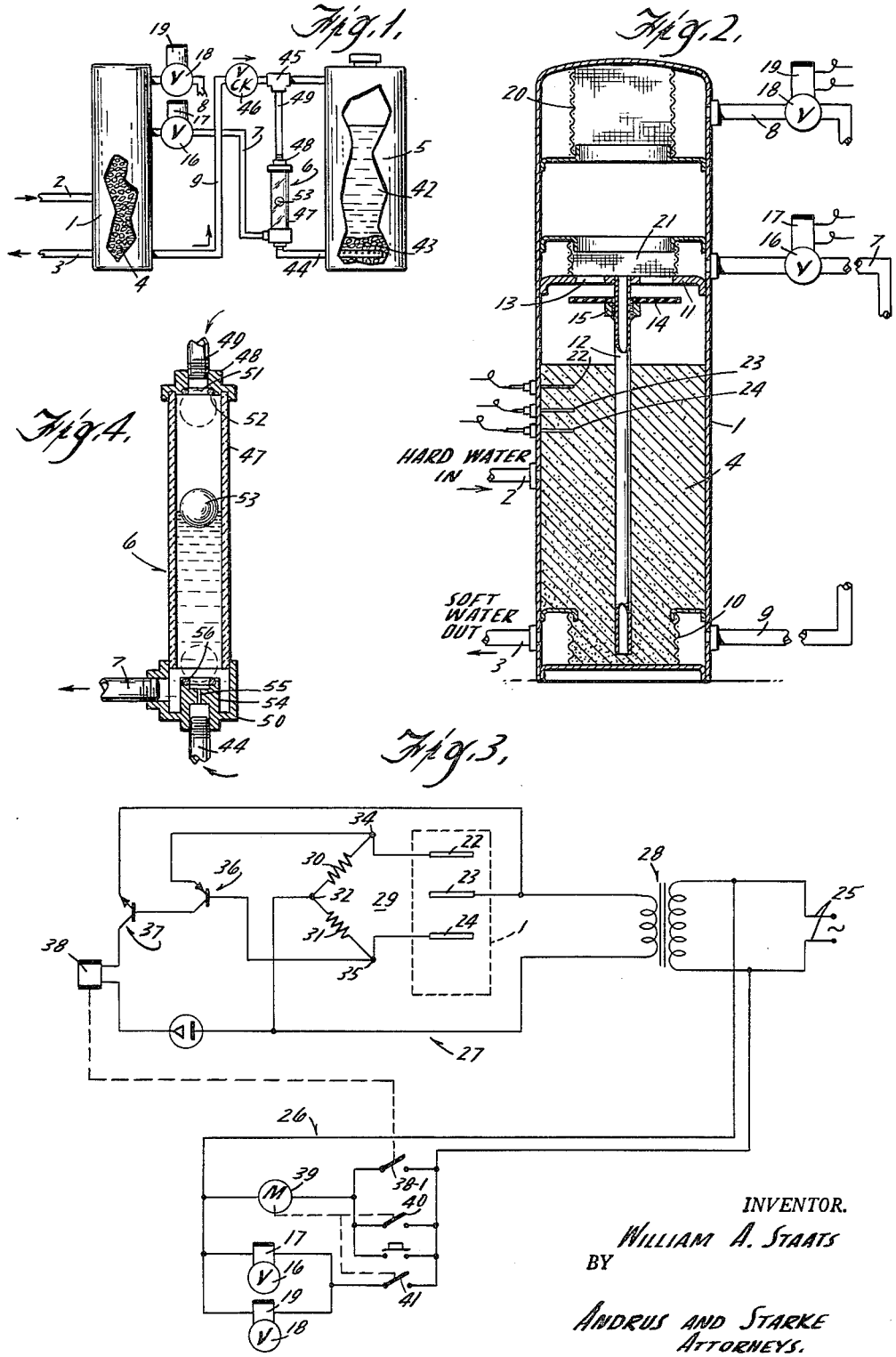

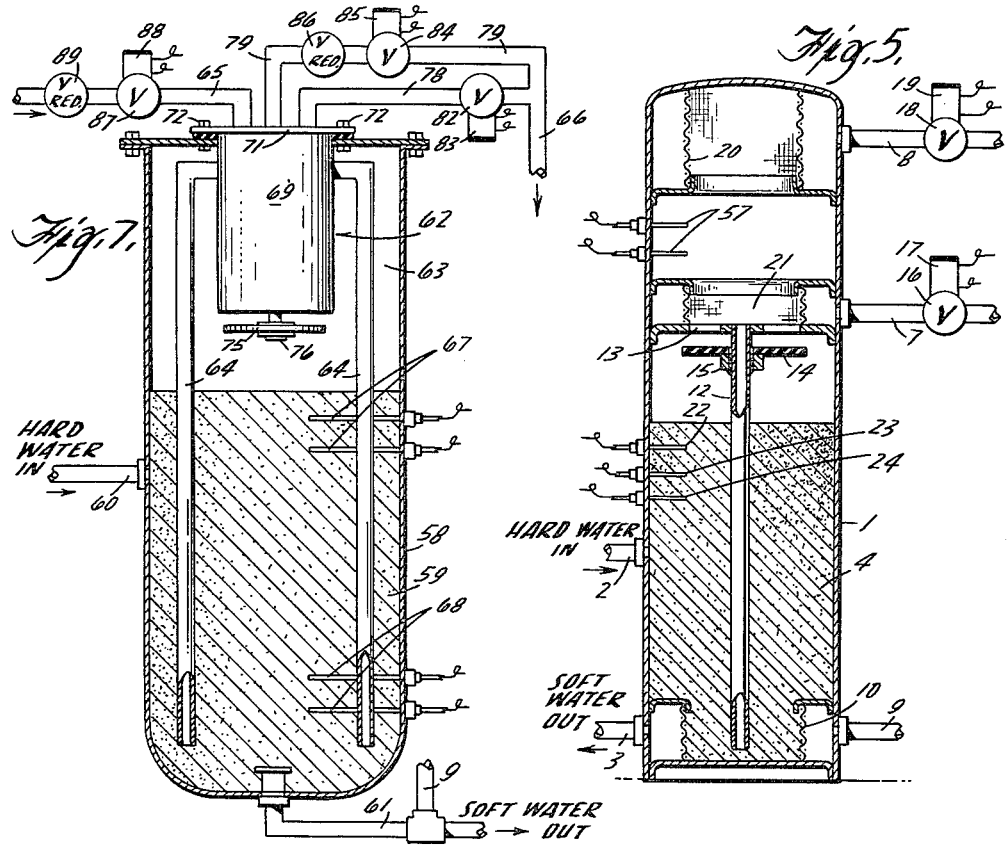
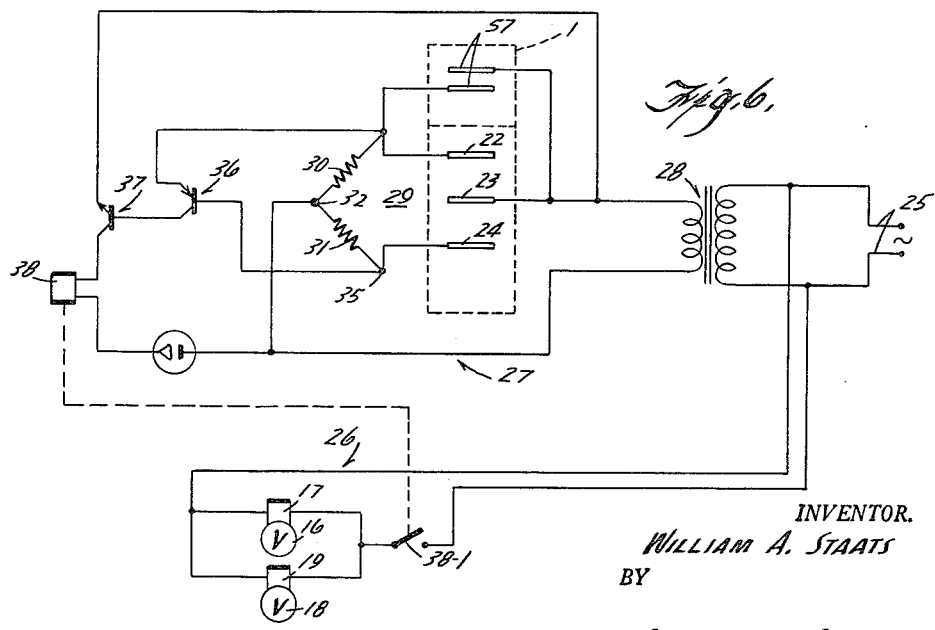

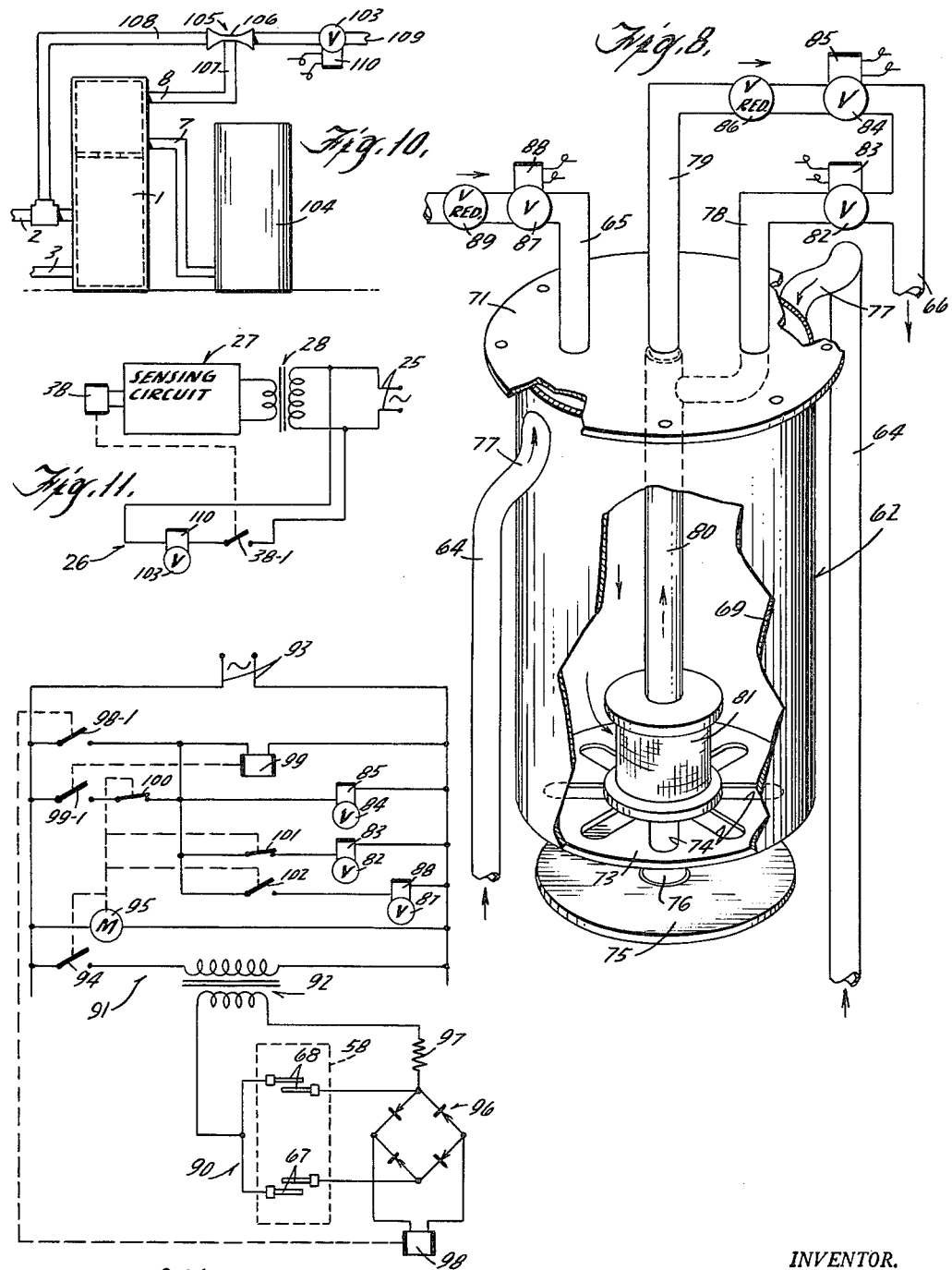

3,220,552
AUTOMATIC REGENERATION OF
TREATING MATERIAL
William A. Staats, Bradley, Ill., assignor, by mesne assignments, to Culligan, Inc., Northbrook, Ill., a corporation of Delaware
Filed Mar. 30, 1961, Ser. No. 99,447
15 Claims. (Cl. 210—96)

This invention relates to automatic regeneration of treating material and is particularly directed to automatic regeneration of a water softening ion exchange bed independently of time and service consumption.

Water softening apparatus and the like normally employs a granular bed of zeolite or other ion exchange carrier housed within a suitable tank. The bed is saturated with sodium ions normally through immersion in a salt brine solution. The tank is connected in the water distribution line and as the hard water passes through the sodium saturated bed, the calcium, magnesium and other water hardening ions are exchanged for the sodium ions held within the bed. The water discharging from the bed is, therefore, more or less soft water depending upon the degree of ion exchange within the bed. After periods of softening, the sodium ions in the exchange bed are exhausted and, consequently, the bed is no longer effective and must be recharged.

Automatic recycling apparatus has been suggested for automatically immersing the bed in a salt brine solution for a short period of time to again saturate the bed with the sodium ions and to subsequently connect the bed in the water service system. Most generally, commercial regeneration systems have employed a preset timing mechanism or a flow responsive control to initiate or trigger the regeneration cycle. A particularly advantageous system for triggering an automatic regeneration cycle independent of time or flow is disclosed in a co-pending application of Morris A. Matalon entitled, "Regeneration Control for Ion Exchange Beds," Serial No. 859,663, which was filed on December 15, 1959, and now abandoned, and is assigned to a common assignee with the present application. As disclosed therein, electrode means are immersed within the ion exchange bed itself. The electrodes are interconnected in a sensing circuit to establish a triggering signal in accordance with the actual condition of the bed proper. Consequently, the regeneration cycle is always established with the bed at a predetermined condition and regeneration always returns the bed to the desired maximum saturation.

It has been suggested that fractional portions of the liquid conditioning material be withdrawn into a separate regeneration chamber either in accordance with or in response to withdrawal of water through the service system or through a continuous operating process. For example, U.S. Patent No. 2,597,693 to Herbert Wilcock, Jr. discloses a pressure operated system wherein withdrawal of service water results in operation of a pumping system to draw brine and a portion of the ion exchange or liquid treating material into a regeneration chamber.

The U.S. Patent No. 1,722,938 to C. H. Nordell for an automatic water softening apparatus provides a method of continuously recirculating portions of an ion exchange bed through a treating chamber and includes means for successively applying in accordance with the successive transmittal of the ion exchange material, measured quantities of brine or treating solution to the bed.

Prior art systems are relatively complicated because of the pressure controls employed. Further, in a continuous automatic regeneration there is the danger that in the absence of continued use or withdrawal of water through the service system, excessive regeneration of the ion exchange bed will be established and water withdrawn from the system will include abnormal amounts of brine or other water charging material.

The present invention is directed to an automatic regeneration and treating system having a special regeneration chamber coupled to the ion exchange chamber in which the ion exchanging bed is held. Upon establishment of a regeneration signal, all or a portion of the exhausted ion exchange material forming the bed is transferred into the regeneration chamber. A brine or other regenerating medium source is interconnected with the regeneration chamber to automatically feed a predetermined amount of brine to the regenerating tank to establish regeneration of the ion exchange material after which the material is returned into the main regenerating chamber.

The present invention includes a simple interconnecting fluid circuit which eliminates all complicated valves from the main line of the service system. Normal pressure is maintained in the service line and permits uninterrupted soft water service during a regeneration cycle. The valving is simple and low in initial cost of construction. Necessary maintenance and servicing will practically be only in the valves and the control circuit, each of which can be readily analyzed and corrected.

In accordance with another aspect of this invention, a brine measuring unit is coupled between the brine source and the regeneration chamber. Upon establishment of a regeneration cycle, the measuring unit discharges into the regeneration chamber to provide a measured amount of brine into the system. The measuring unit is pressure operated and interconnected through the input and the output side of the brine storage unit. The measuring unit is connected to employ the greater weight of the brine or like solution to admit a selected amount of the solution into the measuring unit. The brine measuring unit is responsive to discharge of the brine to also provide back-wash water through the measuring unit and into the regeneration chamber to remove all excess brine from the recharged ion exchange material before it is returned to the ion exchange bed.

The present invention may employ a softening bed which, after regeneration, is only approximately 80 percent fully charged or saturated and which is regenerated when the lower portion of the bed is exhausted to approximately 50 percent of a fully charged condition. This provides a very efficient utilization of the brine and eliminates a phenomena known as hardness leakage. If water is passed through a highly exhausted portion of a bed, hardness ions trapped therein are given up to the water. The latter is particularly objectionable in some geographical area having exceedingly hard water.

The drawings furnish herewith illustrate the best mode presently contemplated for carrying out the invention.

In the drawings:

FIGURE 1 is an elevational view of a water treating system constructed in accordance with the present invention;

FIG. 2 is a vertical section through the water treating tank;

FIG. 3 is a schematic circuit diagram of a control circuit incorporating a system shown in FIGURE 1;

FIG. 4 is an enlarged vertical view through the brine measuring unit shown in FIGURE 1;

FIG. 5 is a second embodiment similar to FIG. 2 showing an alternative regeneration control;

FIG. 6 is a circuit similar to FIG. 3 showing a modified schematic circuit incorporating the regeneration control elements of FIG. 5;

FIG. 7 is a vertical section similar to FIG. 2 showing a regeneration chamber housed within the upper portion of a softening tank;

FIG. 8 is an enlarged prespective view of the regeneration chamber shown in FIG. 7;

FIG. 9 is a schematic circuit diagram for the embodiment of the invention illustrated in FIGS. 7 and 8;

FIG. 10 is a diagrammatic view illustrating a further construction employing a single regeneration control valve; and FIG. 11 is a schematic circuit diagram incorporating the single control valve of FIG. 10.

Referring to the drawings an dparticularly to FIGURE 1, a water softening tank 1 is illustrated having an inlet service conduit 2 adjacent the middle of the tank 1 and an outlet service conduit 3 immediately adjacent the bottom of the tank. A water treating bed 4 of a suitable resin or other medium such as zeolite is held within the lower portion of the softening tank 1 which forms a softening chamber.

The bed 4 extends from somewhat above the level of the inlet service conduit 2 and completely fills the lower portion of tank 1 in the illustrated embodiment of the invention. The upper portion of tank 1 is employed as a regeneration chamber for successively regenerating a portion of the bed 4 in response to a determination of the necessity for regeneration. A brine tank 5 is interconnected to the water softener tank 1 to provide a source of a regenerating medium. A brine measuring unit 6 is interposed between the brine tank 5 and the tank 1 and connected by a brine line 7 to the regeneration chamber for transferring a measured quantity of brine for each regeneration cycle. A drain line 8 is secured to the upper end of the tank 1 and constitutes a waste outlet for withdrawing the spent brine and preventing it from mixing with the service water when the regenerated resin is returned to the bed 4. A soft water conduit 9 is connected to the lower end of the tank generally adjacent the soft water conduit 3 to continuously provide water to the brine tank 5 and to maintain a reservoir of brine solution.

Referring particularly to FIG. 2, the softener tank 1 is clearly illustrated with the bed 4 filling the tank to somewhat above the level of the service water inlet 2. A screen 10 having a laterally extending upper seal plate is secured to the bottom of the tank 1 adjacent conduits 3 and 9 and provides a strained soft water outlet adjacent the bottom of the tank 1 for simultaneously supplying soft water to the conduits 3 and 9. The screen 10 prevents escape of the bed 4.

A partition wall 11 is secured within the tank 1 in spaced relation to the normal upper level of the bed 4 and divides tank 1 into the lower softening chamber and the upper regenerating chamber. A dip tube 12 is coaxially secured within a valve opening 13 in the center of the partition wall 11. The dip tube 12 projects downwardly to the lowermost portion of the bed 4 and is adapted, as hereinafter described, to draw a portion of the bed 4 upwardly into the portion of the tank 1 above the partition wall 11. A check value 14 is slidably carried on the tube 12 and limited in the downward movement by a shoulder 15 adjacent the underside of partition wall 11. The shoulder 15 is spaced from the valve opening 13 to provide a maximum opening of the valve. Valve 14 is preferably formed of a gum rubber or the like which has a density slightly less than water. The valve 14 is, therefore, held in engagement with wall 11 to close opening 13 by the buoyancy effect of the water in tank 1. During a regeneration cycle, the valve 14 is closely held in sealing position by water pressure in the softening chamber housing bed 4 as more fully described hereinafter. At the end of the regeneration cycle, the valve 14 drops under the gravity force of the resin resting on valve 14 and the regenerated resin falls back into and forms a part of bed 4. After the resin has returned to bed 4, the valve 14 floats upwardly into engagement with wall 11 to again close opening 13.

The brine line 7 terminates within tank 1 immediately above the partition wall 11. A brine valve 16 is included in brine line 7 and is biased to normally close the brine line. An operating solenoid 17 is associated with the brine valve 16 and is adapted to automatically actuate and open the brine valve 16 during a regeneration cycle.

Similarly, a drain valve 18 is connected in drain line 8 and a solenoid 19 is coupled to valve 18 to open the drain line 8 during a regeneration cycle.

Slotted strainers 20 and 21, respectively, cover the connection to the brine line 7 and the drain line 8 to prevent loss of zeolite from the regeneration chamber through the respective lines.

Generally, upon establishment of a regeneration cycle, solenoids 17 and 19 are energized to open valves 16 and 18.

The pressure of the water service system causes water to flow upwardly through the dip tube 12 of softener 1 and out the drain line 8 establishing a pressure differential across the valve opening 13. The higher pressure beneath valve 14 maintains the valve 14 in engagement with wall 11 closing the valve opening 13. Simultaneously, the pressure established between the opposite ends of the dip tube 12 causes a portion of the bed 4 to move rapidly upwardly as a slurry through the dip tube 12 and into the regeneration chamber.

The water rising upwardly through tube 12 flows outwardly through the drain line 8 for discharge through a suitable waste outlet.

The small diameter of the dip tube 12 and the resin therein results in a pressure drop of a desired level. The regenerating chamber is, therefore, at the reduced pressure. The opening of the drain valve 18 with valve 16 open results in a pressure at the discharge end of brine line 7 which is lower than the line pressure applied to the measuring unit 6. The brine solution in the measuring unit 6, therefore, discharges into the regeneration chamber and then out through the drain line 8. Immediately following movement of the brine into the regeneration chamber, a wash solution continues to flow through the measuring unit 6 and then through the regeneration chamber to assist in thorough washing of excess brine soltuion from the resin within the regeneration chamber.

After a sufficient wash period, the regeneration cycle is ended through a suitable timer or the like and the valves 16 and 18 close the brine line 7 and drain line 8. The pressure across the valve opening 13 is equalized and the check valve 14 moves downwardly under influence of gravity to open the valve opening 13 and allow the recharged resin to move downwardly onto the top of the bed 4. A freshly charged portion of the resin is continuously made available to replace the spent resin in the lower portion of the bed 4.

The illustrated embodiment of the invention employs a series of probes 22, 23 and 24 suitably secured to tank 1 and embedded within the bed 4 to sense the activity or condition of the bed 4 in accordance with the teaching of the previously described Matalon application. The probes 22–24 are interconnected in suitable triggering circuit such as shown in FIG. 3 and more fully and claimed in the co-pending application of Harold D. Ritchie entitled, "Resistance Sensing Probe System," now U.S. Patent 3,159,573 which issued on December 1, 1964.

Referring particularly to the circuit of FIG. 3, the automatic regeneration cycle control includes a pair of power lines 25 connected to energize an operating circuit 26 including solenoids 17 and 19 and a sensing circuit 27 including the probes 22–24. The sensing circuit 27 is coupled through a relay system to control energization of the operating circuit 26.

The sensing circuit 27 includes a step-down transformer 28 adapted to establish a low voltage control circuit. A bridge circuit 29 is connected to the output of the transformer 28 and includes the probes 22–24 interconnected in a closed loop circuit with a pair of fixed resistors 30 and 31. Probe 23 constitutes one input terminal and the junction 32 of resistors 30 and 31 constitute a second input terminal which terminals are connected to the output of transformer 28.

Output junctions 34 and 35 are provided, respectively, at the connection of the probe 22 to resistor 30 and connection of probe 24 to resistor 31. A pair of transistors 36 and 37 are connected in cascade across the output junctions 34 and 35 to amplify the output of bridge 29. A sensing relay coil 38 is connected in series in the output circuit of transistor 37 and electromagnetically coupled to a set of relay contacts 38–1 in the operating circuit 26. With the bed 4 in a completely charged condition, the resistances of the resin between middle probe 23 and the upper and lower probes 22 and 24 is the same. The bridge 29 is then in a balanced condition and no potential difference exists across the junctions 34 and 35. Consequently, no output current flows. However, as the upper portion of the bed 4 adjacent probe 22 becomes exhausted, the resistance between probe 22 and probe 23 increases and results in an unbalance of the bridge 29. A potential difference is thus established across the junctions 34 and 35 which establishes a current flow in the transistors 36 and 37. At a selected unbalanced condition, the output current is sufficient to energize relay 38 and close the associated contacts 38–1.

A cycle timer motor 39 is series connected with the relay contacts 38–1 across the incoming power line 25. The initial closing of the contacts 38–1 results in energizing of the cycle timer motor 39. A latching switch 40 is mechanically coupled to the timer motor 39 and held closed after initial motor operation for a selected period to maintain energization of the timer motor 39 independently of the relay contacts 38–1. A regeneration switch 41 is also coupled to the timer motor 39 and is electrically connected in series circuit with the operating solenoids 17 and 19 for brine valve 16 and drain valve 18, respectively. Energization of the timer motor 39, therefore, results in energization of the solenoids 17 and 19 and opening of the respective valves.

The opening of the drain valve 18 results in an upward rush of water through the dip tube 12 and valve 14 is firmly held against wall 11 closing the opening 13.

A portion of bed 4 is also rapidly drawn upwardly through 12 into the regeneration chamber formed by the partition wall 11. The rapid movement of the resin causes a violent scrubbing action upon the mineral and breaks the iron and other foreign particles adhering to the mineral therefrom. The particles are relatively small and pass outwardly through the screen 20 and into drain line 8.

Simultaneously, the brine valve 16 is opened and brine is drawn into the regeneration chamber to regenerate the portion of the bed 4 in the regeneration chamber.

As the lower portion of bed 4 is drawn up into the regenerating chamber, the upper portion of the bed 4 moves into the area of probes 22–24 and that similar resistance of the new portion of bed 4 adjacent the probes 22–24 again balances the bridge 29 and results in de-energization of the relay coil 38 and the relay contacts 38–1 open. However, as previously described, the latch switch 40 is latched in by operation of motor 39 to maintain motor energization for a complete cycle of operation.

At the end of the cycle, the timer motor 39 operates to open latching switch 40 and regeneration switch 41. The respective valves 16 and 18 close to prevent further flow through the drain line 8 and entrance of brine through the brine line 7. The pressure across the valve opening 13 balances and the check valve 14 moves downwardly under the influence of the gravity force of the resin within the regeneration chamber. The resin within the regeneration chamber then falls outwardly onto the bed 4 under the influence of gravity.

In the illustrated embodiment of the invention, the brine tank 5 supports a salt reserve which is automatically mixed with a portion of soft water to form the regenerating brine solution 42. A gravel bed 43 is disposed between the solution 42 and an outlet pipe 44 which is connected to the lower end of the tank 5. The outlet pipe 44 is connected as an inlet to the brine measuring unit 6 to provide a measured amount of brine for each regeneration cycle.

A soft water T-connector 45 is inserted in the soft water outlet line 9 from the softener tank 1 and connects the soft water to the tank 5 and to the measuring unit 6. A check valve 46 is connected to the incoming side of the soft water T-connector 45 to prevent back flow of water or brine through the line 9.

As brine is withdrawn from the measuring unit 6 or the brine tank 5, soft water flows inwardly through the check valve 46 to supply water in replacement of the solution fed to the softener tank 1.

Referring particularly to FIGS. 1 and 4, an enlarged view of the measuring unit 6 is shown including a clear plastic tube 47 vertically mounted adjacent the brine tank 5. An upper closure and coupling 48 is secured to the upper end of tube 47 and is connected to the T-connector 45 by a conduit 49. A lower closure and coupling 50 is connected to the outlet pipe 44 from the brine tank 5.

The upper closure and coupling 48 is generally a cap-like member having a threaded aperture receiving the conduit 49 and constituting a valve opening 51. An O-ring seal member 52 is secured within the terminating end of the opening 51. A nylon ball 53 is disposed within the plastic tube 47 and rides on the upper surface of the solution normally in the tube 47. In a static condition with the check valve 46 closed, the brine solution 42 in tank 5 is heavier than the soft water in the plastic tube 47. The brine flows under the influence of gravity through the outlet pipe 44 and into the plastic tube 47. The brine carries the nylon ball 53 upwardly and when the plastic tube 47 is filled, the ball 53 seats against the O-ring seal member 52 and prevents further movement or transfer of brine into the measuring unit 6.

The lower closure and coupling 50 is generally a cap-like member having an opening in which the brine line 7 is secured. A tubular inlet boss 54 is connected to the outlet pipe 44 and projects upwardly through the coupling 50 terminating above the connection to brine line 7. An orifice 55 is formed in the upper end of tubular inlet boss 54 such that flow through the inlet boss 54 results in a dynamic pressure differential and decreases the pressure on the outlet side of the orifice 55. An O-ring seal member 56 is also secured to the upper end of boss 54 to seal the connection to brine tank 5 with the nylon ball 53 seated on O-ring member 56.

During a softening cycle, the pressure in brine line 7 and, therefore, at the lower end of the plastic tube 47 drops with the force established by the water flowing outwardly through the dip tube 12 and the drain line 8. When the pressure drops, the line pressure in the conduit 49 forces the brine from the measuring unit 6 outwardly through line 7. The nylon ball 53 moves downwardly on the upper surface of the brine and fresh soft water flows through the connecting pipe 49 into the plastic tube 47. The brine solution from tank 5 tends to flow through boss 54 and orifice 55 and into the plastic tube 47. However, the orifice 55 establishes a pressure differential which is in excess of the density differential between the water and the brine and prevents appreciable introduction of brine into the measuring unit 6. The water pressure on the upper end of tube 47 thus results in forcing the brine outwardly through the line 7 with only a very slight flow from brine tank 5. The nylon ball 53 functions as a piston moving downwardly with the discharging of the brine and prevents undue mixing and dilution of the soft water in line 49 with the brine in tube 47.

When the measuring unit 6 is emptied of the brine solution, the nylon ball 53 seats on the O-ring seal member 56. The nylon ball 53 is somewhat smaller than the inner diameter of the plastic tube 47 to provide a small flow orifice between the ball and the tube. Therefore, after the ball 53 seats on the O-ring seal member 56, clear soft water flows outwardly through the brine line 7 and into the regeneration chamber to maintain the measuring unit 6 sealed.

The soft water flowing past the seated ball 53 is combined with the back wash or rinse water which flows upwardly through tube 12 and over the regenerated resin in the regeneration chamber. In this manner, all excess brine is removed from the zeolite before it is returned to the bed 4.

When the timing motor 39 completes its cycle and closes the drain and brine valve, the static pressures on the brine tank 5 and the measuring unit 6 return to normal. The greater density of the brine results in a static pressure differential resulting in a movement of the brine through the lower coupling 50 into the plastic tube 47. The nylon ball 53 again moves upwardly with the inflowing brine and seats against the upper O-ring seal 52 to close the circulating passage and hold a selected quantity of brine in the measuring unit 6.

The clear plastic tube 47 provides a visual indication of the location of the nylon ball 53. Therefore, if the salt solution 42 drops below a normal level in the brine tank 5, the level in the tube 47 will be the same as the level in the brine tank. The nylon ball 53 will float on the upper level of the brine solution in tube 47 and provide a visual indication of the necessity for providing additional salt. During this period, the apparatus regenerates in the normal manner with a reduced brine charge. This merely requires more frequent recharging demands.

The service conduits 2 and 3 are completely free of valving and the system results in minimal pressure drops.

Referring particularly to FIGS. 5 and 6, a second embodiment of a softener generally similar to FIG. 2 is illustrated and similar elements in the embodiments are correspondingly numbered to maintain clarity and continuity of explanation.

A set of latching probes 57 generally similar in construction to probes 22–24 are mounted within the upper regeneration chamber in FIG. 5. As shown in FIG. 6, the probes are connected in parallel with the upper and middle probes 22 and 23 which are embedded within the regeneration bed 4.

The relay 38 is connected to the output of the bridge circuit as in the previous embodiment. However, the relay contacts 38–1 are connected directly in series circuit with the drain solenoid 18 and brine solenoid 16. In operation, the sensing circuit 27 triggers relay 38 for establishing a regeneration cycle in the same manner as previously described. However, upon entrance of brine into the regeneration chamber above wall 11, the resistance between the latching probes 57 drops substantially because of the substantially greater conductivity of the brine solution. Consequently, once the regeneration cycle has been established, the probes 57 form a latch maintaining the bridge circuit 29 unbalanced as long as brine is fed into the regeneration chamber.

As previously described, following the measured flow of brine from the measuring unit 6, back wash water flows through the regenerated resin to remove all excess brine. Upon the removal of excess brine, the resistance between probes 57 increases and returns the bridge 29 to the balanced condition. The output of the bridge, therefore, drops and relay 38 is de-energized to again return the apparatus to standby.

In other respects, the second embodiment of the invention operates in the same manner as the first embodiment and no further description thereof is given.

Another construction of the softener 1 is illustrated in FIGS. 7–9 which may employ the same brine system as that previously described.

Generally, the embodiment illustrated in FIGS. 7–9 includes a softening tank 58 with a bed 59 of ion exchange material disposed within the lower portion of the tank. A water inlet conduit 60 and a water outlet conduit 61 are secured, respectively, to the middle and to the lower end of the tank 58. A separate regeneration unit 62 is mounted within a free space 63 within the upper portion of the tank 58 and forms the regeneration chamber. A pair of dip tubes 64 are secured to the opposite upper end portions of the regeneration unit 62 and extend downwardly through the ion exchange bed 59 terminating in slightly spaced relation to the bottom of the ion exchange bed. A brine line 65 and a drain line 66 are secured to the regeneration unit 62 to provide a functioning generally similar to that described for the previous regeneration unit.

An upper pair of sensing probes 67 are secured within the upper portion of the ion exchange bed 59 above the inlet water conduit 60. A similar pair of sensing probes 68 are secured in the lower portion of the bed 59. The sets of probes 67 and 68 are connected in a bridge circuit to trigger a regeneration cycle as more fully described hereinafter with respect to FIG. 9.

The regeneration unit 62 includes a tubular tank 69 located within a complementing opening in the top wall of the softening tank 58. A cover 71 on the top of tank 69 projects radially from the tank and rests on the adjacent top wall of tank 58 and is secured in place by suitable bolt units 72.

Referring particularly to FIG. 8, the bottom wall 73 of the tank 69 is provided with a plurality of circumferentially distributed and radially extending slots or openings 74 to provide communication with tank 58. A flapper or check valve 75 is slidably carried by a shaft assembly 76 for selective closing of openings 74.

The dip tubes 64 are secured to the upper portion of the tank 69 and the uppermost ends are offset as at 77 to extend tangentially of the tank 69 and thereby direct the incoming fluid and ion exchange material circumferentially into the tank 69. The tangential flow results in a centrifugal action which biases the ion exchange material to the outer wall of tank 69 and allows the finely divided iron or the like to move into the center and then out through the drain line 66.

Drain line 66 is secured to the top wall or cover of tank 69 through a full flow line 78 and a mixing line 79. Each of the lines 78 and 79 are connected into communication with a discharge conduit 80 which is coaxially mounted within the tank 69. A strainer 81 is connected to the lower end of conduit 80 to admit water into conduit 80. A solenoid valve 82 is inserted in the full flow line 78 and is provided with an operating solenoid 83 for selective opening and closing of the full flow line 78. Similarly, a solenoid valve 84 is inserted in the mixing valve line 79 and is provided with an operating solenoid 85 for selectively opening and closing of the mixing line 79. A reducing valve 86 is inserted in line 79 to restrict the flow through line 66. The valve 84 in the mixing line 79 is adjusted to provide optimum concentration of brine during the regeneration cycle, as hereinafter described.

Similarly, a solenoid valve 87 having an associated operating solenoid 88 is inserted in the brine line 65 to control feeding of brine into tank 69. A flow reducing valve 89 is also connected in line 65 to adjust the amount of brine fed to tank 69 during a regeneration cycle.

Referring to FIG. 9, the pairs of probes 67 and 68 are shown connected in a sensing circuit 90 to initiate operation of an operating circuit 91.

A step-down transformer 92 connects the sensing circuit 90 to incoming power lines 93. A motor-actuated switch 94 is connected in the input circuit of transformer 92 and is coupled to a timer motor 95 for periodic closing of the switch. The timer motor 95 is connected across lines 93 for continuous energization and the coupling to switch 94 is selected to periodically and momentarily energize the sensing circuit 90; for example, once each hour or the like. This eliminates continual passage of current between the probes 67 and 68 and tends to prolong the useful life thereof.

A full-wave bridge rectifier 96 is connected across the output of transformer 92. A current limiting resistor 97 is connected in series with one side of the connection to rectifier 96 and the upper pair of probes 67 is connected in series with the opposite side of the connection to rectifier. The lower pair of probes 68 is connected in parallel with the upper pair of electrodes and the rectifier 96 in series. With the bed 59 adjacent the lower probes 68 substantially saturated with water softening ions, a low resistance path is provided between the individual probes 68 and the transformer current is shunted past the rectifier 96. As the bed adjacent probes 68 becomes exhausted, the resistance increases and current is fed through the rectifier 96 and probes 67. A sensing relay 98 is connected across the output of rectifier 96 and controls a set of normally open contacts 98–1 in the operational circuit 91. At a selected level of exhaustion of bed 4 adjacent probes 68, the current through rectifier 96 and, therefore, relay 98 rises to the pull-in level of the relay and contacts 98–1 close.

Relay contacts 98–1 are connected in a circuit path with a regeneration latching relay 99 across the power lines 93. Relay 99 controls a set of normally open contacts 99–1 which are connected in parallel with relay contacts 98–1 and, therefore, latch relay 99 to lines 93 independently of contacts 98–1.

A normally closed switch 100 is connected in the parallel circuit of relay contacts 99–1 and is coupled to timer motor 95. Switch 100 is closed simultaneously with the closing of switch 94 and is held closed for a period sufficient to complete a regeneration cycle.

The mixing line valve solenoid 85 is connected across the power lines 93 in series with the contacts 99–1 and switch 100. The full flow line valve solenoid 83 is connected in series with a normally closed motor-actuated switch 101 and in parallel with solenoid 85. Switch 101 is also coupled to motor 95 and is opened a selected period after establishment of the regeneration cycle to de-energize solenoid 83 and close valve 82.

The brine valve solenoid 88 is connected in series with a normally open motor-actuated switch 102 and in parallel with the switch 101 and solenoid 83. Switch 102 is coupled to motor 95 and is closed in synchonism with the opening of switch 101 and the closing of the full flow valve 82.

In summary, when the sensing circuit 90 establishes a regeneration signal and contacts 98–1 close, the latch relay 99 is energized and closes the latching contacts 99–1. Current is then fed to mixing line solenoid 85 and to full flow valve solenoid 83 to open the respective valves 84 and 82. The water pressure in tank 58 and 69 results in a discharge of water through the opened full flow line 78 and mixing line 79 which creates a pressure differential across valve 75. The valve 75 moves upwardly to substantially close valve openings 74.

A pressure differential also appears across the take-up tubes 64 forcing bed 4 and water upwardly through the tubes at a relatively high velocity. The high velocity of the bed material causes vigorous agitation and scrubbing which will break up the iron and allow it to move downwardly in tank 69 and out through the conduit 80. The centrifugal action as the water and resin slurry enters tank 69 also biases the resin to the outer wall and allows the iron to be carried to the strainer 81 and out through conduit 80 to drain line 66.

After a selected period to permit the backwash and regenerating tank filling function, the motor 95 opens switch 101 and the circuit to the full flow line solenoid 83. The associated valve 82 closes and restricts discharge to line 79. Simultaneously, switch 102 is closed by motor 95 to complete the circuit to the brine solenoid 88 and admit brine to tank 69. The reducing valves 86 and 89 are adjusted to establish a desired brine solution or concentration in tank 69. The resin filled tubes 64 also function as an orifice and the brine flow is adjusted accordingly. The brine solution regenerates the resin within the tank 69.

At the termination of the brining period, the switch 102 is opened and brine valve 87 closes. Clear water continues to flow upwardly through the tubes 64 and rinses all excess brine from the regenerated resin.

Following complete rinsing of the resin, the motor 95 opens the switch 100 and breaks the circuits to the relay 99 and solenoid 85 to stop the regeneration cycle. The latching contacts 99–1 open and energization of relay 99 is again made responsive to the output of the sensing circuit 90.

The pressure differential across check valve 75 drops to zero and the check valve moves away from the valve openings 74. The regenerated resin falls from tank 69 and onto the bed 59.

If the resin adjacent the lower probes 68 is still exhausted, the sensing circuit 90 is conditioned to energize relay 98. When timer motor 95 again closes switch 94, sensing relay 98 is energized and another resin regeneration cycle is established.

Referring to FIGS. 10 and 11, a softener unit similar to that shown in FIGS. 5 and 6 is illustrated having a single solenoid valve 103 in the operating circuit 26 for the automatic regeneration cycle control. Generally, corresponding and similar elements are numbered in accordance with the previous description.

In the embodiment of FIGS. 10 and 11, an open or unpressured brine tank 104 constitutes the source of the softening solution. The brine tank 104 is of a known construction having floats, not shown, or similar elements controlling the introduction of water and the amount of brine withdrawal for each regeneration cycle. The brine tank 104 is connected directly to the brine line 7. For example, tank 104 may be constructed in accordance with the United States Patent No. 2,954,795 of E. J. Tischler which issued October 4, 1960.

An ejector 105 of known construction is provided with a throat section 106 connected by a conduit 107 to the drain line 8 from the regeneration chamber of softener 1. The inlet side of ejector 105 is connected by a conduit 108 to the hard water inlet 2 which constitutes a pressurized source of fluid for operating ejector 105. A discharge or drain line extension 109 is connected to the outlet side of ejector 105 and the solenoid valve 103 is connected therein. The solenoid valve 103 is a normally closed valve having an operating solenoid 110 connected in the operating circuit 26 of the regeneration control circuit shown in FIG. 11.

The control circuit of FIG. 11 includes a sensing circuit 27 corresponding to that shown in FIG. 6 and, therefore, shown in block diagram and an operating circuit 26 which includes only the solenoid 110.

The operation of the embodiment illustrated in FIGS. 10 and 11 is as follows.

The sensing circuit 27 functions as previously described to energize relay 38 and close contacts 38–1 when regeneration of the bed 4 is required. When contacts 38–1 close, the solenoid 110 is energized and opens the solenoid valve 103. The water pressure in softener 1 holds check valve 14 closing the opening 13 and forces a portion of bed 4 into the regenerating chamber.

The opening of valve 103 results in the high pressure water from inlet 2 operating the ejector 105 and establishing a vacuum or other selected pressure below atmospheric pressure at the throat 106 and, therefore, in the regeneration chamber. A selected volume of brine is, therefore, drawn into the regeneration chamber from the brine tank 104 and the resin in the regeneration chamber is regenerated.

A pressure drop exists across the dip tube 12 after the regeneration chamber is resin filled. However, the ejector 105 further reduces the pressure in the regeneration chamber and causes the brine solution to discharge outwardly through the drain line 8 and ejector 105.

The brine in the regeneration chamber bridges electrodes or probes 57 and latches the solenoid 110 in circuit until the selected brine solution has passed out of the regeneration chamber.

After back washing of the resin in the regeneration chamber is completed, the latch is broken and the solenoid 110 is de-energized. Valve 103 closes and the system returns to the balanced pressure condition. The weight of the resin on valve 14 results in opening of the opening 13 and the regenerated resin drops onto the top of bed 4.

Water from the regenerating chamber flows back to the brine tank 104 and replaces the solution which had been withdrawn as brine to form another charge of brine for a subsequent regeneration cycle.

The present invention provides a water softening system of a relatively simple and inexpensive construction which will require very little maintenance and which can be readily checked and repaired when required.

The resin for bed 4 may, as previously described, may be any suitable material such as the conventional zeolite. For optimum operation and long life, the material selected is preferably in the form of spherical granules to establish maximum fluidity and is characterized by a high strength and resistance to attrition. Recent products which particularly exhibit the desirable properties for use in this invention are available and sold under the trade names of White Dowex and XE 210. The latter material is a product of Rohm and Haas Company.

Various modes of carrying out the invention are contemplated as being within the scope of the following claims particularly pointing out and distinctly claiming the subject matter which is regarded as the invention.

I claim:

1. In an automatic water treating system having a water softening chamber containing a water softening bed and a hard water inlet and a soft water outlet to pass water through the bed, a regeneration chamber including a conduit terminating in the bed for transporting at least a portion of the bed therethrough to the regeneration chamber and having a drain outlet forming a low pressure discharge, means to open and close the drain outlet, a regenerating liquid source having an input side including means to selectively connect said input side to said softening chamber soft water outlet to receive soft water from the soft water side of the water softening chamber and said regenerating liquid source having a liquid outlet below said inlet, said regenerating liquid having a greater density than water, a measuring chamber having a pair of inlets connected respectively to the input side of the regenerating liquid source and thereby establishing a pressure in the measuring chamber and to the liquid outlet of the regenerating liquid source to receive regenerating liquid and having an outlet connected to the regeneration chamber, the pressure in the measuring chamber causing the liquid to discharge into the regeneration chamber when said drain outlet is open, valve means in said measuring chamber and responisve to the differential pressure established by the relative heavier density of the regenerating liquid such that the regenerating liquid flows into the measuring chamber, and pressure reducing means in the inlet from the regenerating liquid source to the measuring chamber to establish a differential pressure across the valve means to effectively close the inlet connected to the outlet of the liquid source during the period the drain outlet is opened.

2. In an automatic water treating unit for connection in a water system, a water softening chamber containing a water softening bed and having a hard water inlet and a soft water outlet, a regeneration chamber communicating with the softening chamber and having a drain outlet forming a low pressure discharge, means to open and close the drain outlet, a conduit terminating in the regeneration chamber and in the bed transporting at least a portion of the bed to the regeneration chamber, a container for holding a regenerating liquid of a density greater than water and having a container inlet connected in the water system and having a regenerating liquid outlet below the level of the container inlet, a measuring chamber having a pair of inlets connected respectively to the opposite connections of the container and having a regenerating liquid outlet connected to the regeneration chamber, valve means connected in the regenerating liquid outlet of the measuring chamber and in the drain outlet and biased to a closed position, regenerating control means for establishing a regenerating cycle during which at least a portion of the bed is treated by the regenerating liquid and having means to open said measuring chamber and drain outlet valve means and thereby establish flow through said conduit to transport the bed into the regeneration chamber and flow through the regenerating liquid outlet of the measuring chamber and transfer the regenerating liquid from the measuring chamber into the regeneration chamber, valve means in said measuring chamber and responsive to the differential pressure established by the relative heavier density of the regenerating liquid to fill the measuring chamber, and pressure reducing means in the regenerating liquid inlet of said measuring chamber connected to the outlet of the container establishing a differential pressure to prevent movement of the liquid from the container during a regenerating cycle.

3. In an automatic water treating system, a water softening tank, a water softening bed in the lower portion of the tank adapted to be regenerated with a regenerating liquid having a density greater than water, a hard water inlet in the tank adjacent the middle of the bed and a soft water outlet to pass water through the bed, a regeneration chamber having a selectively opened drain outlet forming a low pressure discharge and including a conduit terminating in the bed to transport at least a portion of the bed to the regeneration chamber, a regenerating liquid tank having an input conduit adjacent the upper portion of the tank connected to the soft water outlet and having a tank outlet adjacent the lower end of the tank, a tubular measuring chamber having end inlet passages connected respectively to the soft water outlet and to the regenerating liquid tank outlet and having a measuring chamber outlet adjacent the end passage connected to the tank outlet, said measuring chamber outlet being connected to the regeneration chamber, the connection to the soft water outlet providing a pressure source moving the regenerating liquid into the chamber when said drain outlet is open, a valve member freely movable in said measuring chamber and said valve member including means to engage and close the respective inlets to the measuring chamber, the differential pressure established by the relative heavier density of the regenerating liquid causing the regenerating liquid to fill the measuring chamber and force the valve member into closing engagement with the one end inlet, and pressure reducing means in the inlet connected to the regenerating tank outlet to establish a differential pressure upon discharge of the measuring chamber whereby the valve member moves to close the opposite inlet.

4. The construction of claim 3 wherein said valve member is smaller than the width of the measuring chamber and allows water to flow through the measuring chamber and to the regeneration chamber after the means of the valve member engages the inlet connected to the tank during the subsequent portion of the regeneration of the bed.

5. A water softener having a softening chamber adapted to be operably connected in a pressurized water system and containing a granulated bed of ion exchange material adapted to be regenerated by immersion in a softening ion solution, the improvement comprising a regeneration chamber above the softening chamber and having a bottom opening, a valve member of a material less dense than water, a support slidably mounted on the valve member below the opening whereby the buoyancy effect of the water moves the valve to close the opening in the regeneration chamber, a dip tube arranged to carry the ion exchange material into the regeneration chamber, a drain line connected to the regeneration chamber in spaced relation to the opening, a normally closed valve in the drain line, means to open the normally closed valve and thereby establish a differential pressure across the opening and the valve member to maintain the opening closed, a water softening ion solution tank, an ion solution line connected to the regenerating chamber and to the ion solution tank, normally closed valve means in the ion solution line, and regeneration means adapted to open the two valve means to fill said regeneration chamber and to regenerate the portion of the bed fed to the regeneration chamber.

6. The construction in claim 5 having said dip tube mounted within said opening and constituting a support for said valve member, and a stop on said dip tube to restrict downward movement of the valve member.

7. A water softener unit, comprising a softening tank containing a granulated bed of ion exchange material in the lower portion of the tank having means for connection in a pressurized water system, a partition wall above the material defining a regeneration chamber in the upper portion of the bed, said wall having an opening, a dip tube secured within the opening and extending downwardly through the ion exchange material, a normally open check valve mounted on the dip tube and overlying the opening to close said opening, a drain line connected to the upper end of the tank, and electroresponsive valve means in the drain line, opening of the drain line establishing a differential pressure across the check valve effective to close the opening during a regeneration cycle, an ion solution tank for supplying an ion solution for regenerating of the ion exchange material, an ion solution line connected to the tank immediately above the partition wall, valve means adapted to open and close the ion solution line, regeneration control means connected to open said valve means to transfer at least a portion of the ion exchange material and the ion solution to the regeneration chamber in response to exhaustion of the water softening ions in the exchange material.

8. A water softener unit, which comprises a softening tank having a bed of ion exchange granulated material in the lower portion of the bed, a hard water inlet spaced downwardly of the top of the bed and a soft water outlet spaced downwardly from the hard water inlet, a regeneration tank secured within the softening tank and above the bed, a normally open check valve in the bottom wall of the regeneration tank, a take-up tube tangentially secured to the regeneration tank and extending downwardly through the bed to the lower portion thereof, a full flow drain line secured to the top of the regeneration tank, a metering drain line connected to the top of the regeneration tank, a reducing valve in the metering drain line, a regenerating solution line connected to the top of the regeneration tank, a metering valve in the solution line, electrically controlled valves in each of the drain lines and the solution line, regeneration control means including sensing means to determine the necessity of regeneration and operating means responsive to said sensing means to sequentially open the valve in the full flow line to establish flow through the check valve effective to close the check valve and through the take-up tube to transport a portion of the bed into the regeneration tank and subsequently to close the valve in the full flow line and to simultaneously open the valves in the metering drain line and in the ion solution line and after a selected regeneration period to close the valves in the metering drain line and the ion solution line.

9. A solution measuring system for successively withdrawing a selected amount of a regeneration liquid from a storage unit having an upper inlet side and a lower outlet side with a gravity discharge for intermittent regeneration of a water softening medium, which comprises a measuring chamber having an upper inlet connected to the upper inlet side of the storage unit and a lower inlet connected to the lower outlet side of the storage unit and having an outlet including means to selectively open said outlet, check valve means in said measuring chamber to open and close the upper and lower inlets thereof, the density of the solution regeneration liquid from the storage unit being effective to open the lower inlet when the outlet is closed and to close the upper inlet after the measuring chamber is filled with a selected quantity of the liquid, and pressure reducing means in the lower inlet to reduce the dynamic pressure whereby the upper inlet is opened and the lower inlet is closed in response to the opening of the outlet.

10. A solution measuring system for successively withdrawing a selected amount of a regeneration liquid from a storage unit having an inlet side and an outlet side, a gravity discharge for intermittent regeneration of a water softening medium, which comprises a measuring chamber having an upper inlet connected to the inlet side of the storage unit and a lower inlet connected to the outlet side of the storage unit and having an outlet including means to selectively open said outlet, a float valve in said measuring chamber to open and close the upper and lower inlets, the density of the solution being effective to open the lower inlet when the outlet is closed and to close the upper inlet after the measuring chamber is filled with a selected quantity of the solution, and pressure reducing means in the lower inlet to reduce the dynamic pressure whereby the upper inlet is opened and the lower inlet is effectively closed in response to the opening of the outlet.

11. A solution measuring system for successive withdrawal of an ion exchange solution from a storage tank having an inlet side and a bottom discharge, which comprises a transparent tubular measuring unit having a top inlet terminating in an inner valve seat and a bottom discharge opening and a bottom tubular inlet extending inwardly of the bottom discharge opening and terminating in a valve seat, means to mount the measuring unit in a vertical position with the lower end of the unit generally aligned with the lowest level of the solution in the storage tank, the top inlet being connected to the inlet side of the storage tank and the lower inlet being connected to the bottom discharge of the storage tank, a ball float disposed within the tubular measuring unit for movement into sealing engagement with the respective valve seats, and said ball float being only slightly smaller than the inner diameter of the tubular measuring unit to serve as a piston during the downward movement of the float and to permit discharge from the measuring unit with the float resting on the valve seat of the lower inlet.

12. An automtaic water softener for softening water in a water distribution line, comprising a water softening chamber connected in the water distribution line and having a hard water inlet side, a closed regeneration chamber, a transfer tube connected to the softening chamber and the regeneration chamber for transferring at least a portion of the ion exchange material to the regeneration chamber, a brine source of regenerating fluid connected to the regeneration chamber, a drain line from the regeneration chamber, a pressurized source of fluid, an ejector having a throat section connected to the drain line and an inlet connected to the pressurized source of fluid and an outlet, electro-responsive means selectively opening said ejector outlet to simultaneously transfer ion exchange material and regeneration fluid into said regeneration chamber.

13. The construction of claim 12 wherein said brine source has means to maintain said source at atmospheric pressure and said ejector includes means to establish a pressure below atmospheric pressure in the regeneration chamber upon actuation of said electroresponsive means.

14. The construction of claim 12 wherein the water distribution line constitutes the pressurized source of fluid for operating said ejector.

15. The construction of claim 14 having the ejector inlet connected to the distribution line on the hard water inlet side of the softening chamber.

References Cited by the Examiner

UNITED STATES PATENTS

| | | | |
|---|---|---|---|
| 1,693,829 | 4/1928 | Sweeney | 210—190 |
| 1,722,938 | 7/1929 | Nordell | 210—33 |
| 1,763,783 | 6/1930 | Hodkinson | 210—189 X |
| 1,893,933 | 1/1933 | Dotterwiech | 210—96 |
| 2,468,791 | 5/1949 | Thomson | 210—96 X |
| 2,565,045 | 8/1951 | Ray | 222—69 X |
| 2,628,194 | 2/1953 | Gilwood | 210—96 |
| 3,029,949 | 4/1962 | Whitlock | 210—134 |

REUBEN FRIEDMAN, *Primary Examiner.*

HERBERT L. MARTIN, *Examiner.*